United States Patent
Bennett

Patent Number: 5,903,485
Date of Patent: May 11, 1999

[54] DIVISION BY A CONSTANT

[75] Inventor: Frank W. Bennett, Fort Collins, Colo.

[73] Assignee: Hewlett Packard Company, Palo Alto, Calif.

[21] Appl. No.: 08/625,463

[22] Filed: Mar. 29, 1996

[51] Int. Cl.[6] ........................................ G06F 7/52
[52] U.S. Cl. .................. 364/764; 364/761; 364/762; 364/763; 364/765; 364/766; 364/767; 235/160
[58] Field of Search .................... 364/764, 761, 364/767, 763, 762, 765, 766; 235/160, 156

[56] References Cited

U.S. PATENT DOCUMENTS 4,688,186   8/1987   Ferrell et al. ........................... 364/764
5,206,825   4/1993   Takagi et al. ......................... 364/746.2

Primary Examiner—Reba I. Elmore
Assistant Examiner—McDieunel Marc
Attorney, Agent, or Firm—Edward L. Miller

[57] ABSTRACT

A ripple through divider of a dividend by a constant is obtained by cascading a plurality of partial quotient tables. Each table incorporates the same divisor, so the divisor need not appear as an input. In one binary integer implementation for an n bit dividend that dividend is represented as n+1 bits having an MSB of 0. If the binary divisor is of k bits, then the most significant k+1 bits are applied to an input of a first partial quotient table. It produces one bit of fractionary quotient that becomes the MSB of the final quotient, and k bits of fractionary remainder. That fractionary remainder is combined as MSB's with an LSB that is the next and most significant unused dividend bit. This forms k+1 inputs to a second partial quotient table. It in turn produces a partial quotient bit that becomes the second most significant final quotient bit, and k-many more fractionary remainder bits. The cascading continues with additional stages of partial quotient tables until all dividend bits have been used. At that level the final quotient is available and the last partial remainder bits are indeed the actual final remainder bits. The partial quotient tables may be look-up tables implemented as ROM's or they may be constructed of discrete gating.

5 Claims, 8 Drawing Sheets

DIVIDEND IN = $\{d_3 d_2 d_1 d_0\}$ =

| | | 0 | 1 | 2 | 3 | 4 | 5 | 6 | 7 | 8 | 9 |
|---|---|---|---|---|---|---|---|---|---|---|---|
| q = | | 0 | 0 | 0 | 0 | 0 | 1 | 1 | 1 | 1 | 1 |
| $\{r_2 r_1 r_0\}$ = | | 0 | 1 | 2 | 3 | 4 | 0 | 1 | 2 | 3 | 4 |

7 → 0111
9 → 1001
2 → 010
3 → 011
4 → 100

(DIVISOR=5)

FIG. 2

```
//
// x divided by 5
// input: x-7 bits
// quotient: q-5 bits
// remainder: r-3 bits
//    2/6/95fwb
//
module xdiv5m2 (q,r,x);
   output [4:0] q;
   output [2:0] r;
   input [6:0] x;
   wire [3:0] za,zb,zc,zd,ze;

function [3:0] div;
      input [3:0] d;

case (d) //synopsys full_case parallel_case
         9: div= 4'b1100; //q=1; rem=4;
         8: div= 4'b1011; //q=1; rem=3;
         7: div= 4'b1010; //q=1; rem=2;
         6: div= 4'b1001; //q=1; rem=1;
         5: div= 4'b1000; //q=1; rem=0;
         4: div= 4'b0100; //q=0; rem=4;
         3: div= 4'b0011; //q=0; rem=3;
         2: div= 4'b0010; //q=0; rem=2;
         1: div= 4'b0001; //q=0; rem=1;
         0: div= 4'b0000; //q=0; rem=0;
         default: div= 4'b000;
      endcase
   endfunction assign za = div( { 1'b0, x[6], x[5], x[4] } );
   assign zb = div( {za[2],za[1],za[0],x[3] } );
   assign zc = div( {zb[2],zb[1],zb[0],x[2] } );
   assign zd = div( {zc[2],zc[1],zc[0],x[1] } );
   assign ze = div( {zd[2],zd[1],zd[0],x[0] } );
   assign q = {za[3],zb[3],zc[3],zd[3],ze[3] };
   assign r = {ze[2], ze[1], ze[0] };

endmodule
```

FIG. 3A

```
// synopsys translate_off module test;
   reg [6:0] i;
   wire [4:0] q1,q2;
   wire [2:0] m;

xdiv5m2 m2(q2, m, i) ;

initial begin
     i = 7'b0;
     $stop;
   end always begin
     #1
     if(i != (q2+(q2<<2)+m) )
        $display("i %d q1 %d q2 %d mod %d", i, q1, q2, m);
     if(i ==127) $finish;
     #5 i = i+1;
   end
endmodule
```

FIG. 3B

DIVISION BY A CONSTANT

BACKGROUND OF THE INVENTION

Sophisticated high performance systems often include specialized hardware that either performs a desired task directly or that assists the processor in an embedded system. An example is the graphics system of a modern computer workstation. There one often finds entire hardware subsystems arranged in a serial pipeline to successively perform the various tasks that need to be accomplished. In a computer graphics environment there can be hardware that clips primitive shapes such as lines, planes and triangles, against other planes and the surfaces of rectangular solids. Additional hardware, for example, handles the task of polygon rendering, and so on. Despite such solutions, there is an irresistible urge for things to run faster, and not just in computer graphics systems, either.

We may generalize a bit and say that one approach for speeding things up (for a suitable class of problems) is to adopt a parallel architecture. Let us say that a single instance of a hardware set that solves a problem is a "channel". A parallel solution would then involve a plurality of identical (or nearly so) channels. Once this arrangement is adopted it becomes necessary to decide which channel is to be selected to operate on the next set of incoming data. There are many ways this might be done, but assuming that each channel is otherwise equally appropriate to perform the operation, and that perhaps there is some input buffering for each channel, a good way is often to assign a channel number k according to the relationship k=(some parameter in the data) mod n, where n is the number of channels. What the parameter is does not really matter, as long as it is suitable. For example, in a computer graphics system the parameter might be an address that some earlier subsystem assigned to a primitive that is to processed by the graphics system. The idea is to get an integer k in the range $0 \leq k < n$. This may be done by dividing the suitable parameter by n and taking k as the remainder. This brings us to the question of how to perform such divisions quickly and without undue expense. We note that the usual division mechanisms all are completely general in that they expect to accommodate arbitrarily variable divisors. We have in mind division by a fixed divisor, or a constant, or, perhaps by a rather limited number of divisors. It would be desirable if there were a way to take advantage of this limitation on the divisor to reduce the complexity of the division, and at the same time speed it up.

One prior art solution to this more restricted class of division problem has been to multiply the parameter by the reciprocal of the desired divisor. This provides the quotient, but not the integer remainder. Instead, you get the sum of the quotient plus a decimal, octal or binary (depending upon the radix in use) Arabic fraction. To recover the remainder (i.e., the integer numerator of an indicated division whose denominator is also our divisor) it is necessary to subtract out the quotient and exchange the remaining Arabic fraction for an integer (as by a look-up table). It would be desirable if a genuine division mechanism could instead be simplified to take advantage of the fixed divisor.

It should also be kept in mind that channel assignment in a parallel architecture is but one possible use for a mechanism that can divide an integer (or, perhaps, a fixed point number) by a constant.

SUMMARY OF THE INVENTION

A ripple through divider of a dividend by a constant is obtained by cascading a plurality of partial quotient tables. Each table incorporates the same divisor, so the divisor need not appear as an input. In one binary integer implementation for an n bit dividend that dividend is represented as n+1 bits having (most significant bit) an MSB of 0. If the binary divisor is of k bits, then the most significant k+1 bits are applied to an input of a first partial quotient table. It produces one bit of partial quotient that becomes the MSB of the final quotient, and k bits of fractionary remainder. That fractionary remainder is combined as MSB's with an (least significant bit) LSB that is the next and most significant unused dividend bit. This forms k+1 inputs to a second partial quotient table. It in turn produces a partial quotient bit that becomes the second most significant final quotient bit, and k-many more fractionary remainder bits. The cascading continues with additional stages of partial quotient tables until all dividend bits have been used. At that level the final quotient is available and the last fractionary remainder bits are indeed the actual final remainder bits. The partial quotient tables may be look-up tables implemented as ROM's or they may be constructed of discrete gating.

Other arrangements are possible that produce two or more quotient bits per stage of partial quotient table. This can reduce the number of propagation delays that are incurred to obtain the final quotient and the final remainder.

BRIEF DESCRIPTION OF THE DRAWINGS

FIG. 2 is a table indicating the relationship between inputs and outputs for the partial quotient tables of FIG. 1, assuming that a seven bit binary dividend is to be divided by five;

FIG. 3 is a an actual input specification to a logic synthesis tool for generating an array of gates to implement in an IC the partial quotient tables of FIGS. 1 and 2;

DESCRIPTION OF A PREFERRED EMBODIMENT

Figure 1:
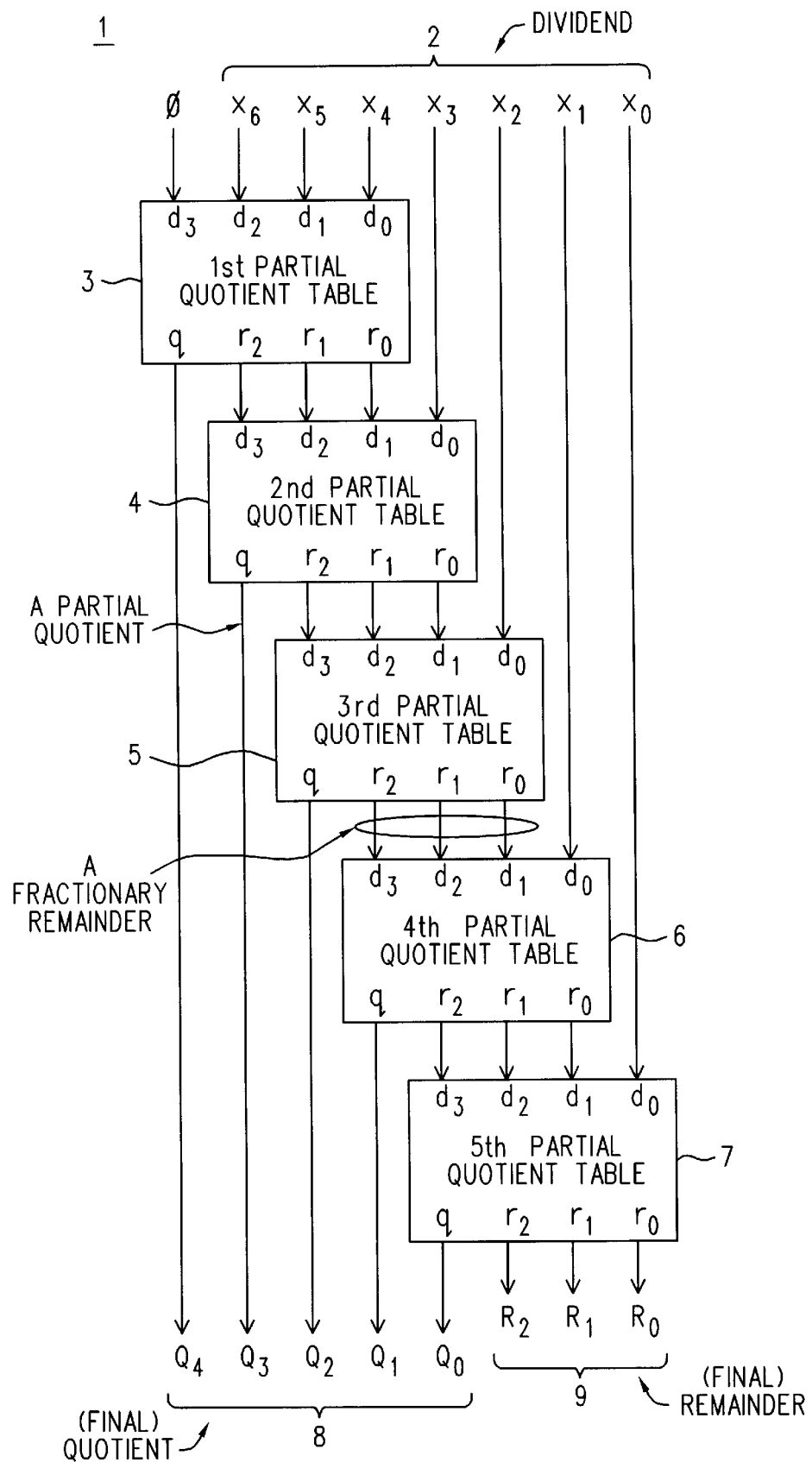
FIG. 1 is a block diagram of a circuit that divides an integer, or perhaps a fixed point number, by a constant to produce both a quotient and an integer remainder.

Refer now to FIG. 1, wherein is shown a block diagram 1 of a circuit that divides a binary integer 2 by a constant. By way of illustrative example, we shall assume that the binary number 2 to be divided (the dividend) is a seven bit integer expressed as the eight bits: $0x_6x_5x_4x_3x_2x_1x_0$. We shall further assume, again strictly by way of example, that the dividend 2 is to be divided by five, and that both the binary quotient 8 and the binary remainder 9 are desired results.

Now observe the arrangement of the five $1_{st}$ through $5_{th}$ partial quotient tables 3–7. The $1_{st}$ partial quotient table 3 receives as inputs at $d_3d_2d_1d_0$ the four most significant bits $0x_6x_5x_4$ of the dividend 2. It is constructed to produce at an output q a single bit of partial quotient and at outputs $r_2$, $r_1$ and $r_0$ a three-bit fractionary remainder. The term "fractionary" is defined in the next paragraph. The q output from the $1_{st}$ partial quotient table 3 becomes the bit $Q_4$ of the final quotient 8. The output bits $r_2r_1r_0$ from the $1_{st}$ partial quotient table 3 are combined as MSB's with an LSB of $X_3$ to produce the inputs applied to $d_3d_2d_1d_0$ of the $2_{nd}$ partial quotient table 4. In continuing fashion the output q of the $2_{nd}$ partial quotient table 4 becomes bit $Q_3$ of the final quotient 8. The LSB $x_0$ of the dividend 2 becomes the LSB of the input to $d_3d_2d_1d_0$ of the $5_{th}$ partial quotient table 7, whose q output becomes the LSB $Q_0$ of the final quotient 8 and whose outputs $r_2r_1r_0$ become the final remainder 9.

The term "remainder" is one with several established uses, and even in the field of fixed point division some existing terminology, such as "partial remainder" are subject to differing interpretations. It would be nice if we could call our remainder bits $r_2r_1r_0$ (or however many bits they may be) a "partial remainder" so as to match the term "partial quotient", but that might possibly lead to confusion. In some division processes there are what their developers have called "partial remainders" which are arithmetically complete, in that when added to the product of the partial quotient(s) times the divisor the sum is precisely the dividend. Clearly, our $r_2r_1r_0$ does not have that property; it is more the intermediate difference produced by subtracting the partial product of the latest quotient digit times the divisor from the corresponding portion of the dividend, just as performed in manual division as taught in elementary school. Now, it would not do to call our $r_2r_1r_0$ an intermediate remainder or intermediate partial remainder, since those would seem to preclude its also being the final remainder obtained at the end of the process. And to simply call it a remainder, while accurate, lacks specificity desired in the Claims that follow. Hence, we coin the term "fractionary remainder." According to the larger dictionaries, the term 'fractionary' means "concerned with or done by fractions, or piecemeal." We do not mean that our $r_2r_1r_0$ is itself a fraction, although the number thus represented (when a final remainder) is often written as the numerator of a fraction whose denominator is the divisor; no, our $r_2r_1r_0$ is an integer. We use the term more in the sense of piecemeal, as a synonym for the linguistically more desirable (but alas unavailable) "partial." (We would call it a piecemeal remainder, but that seems so, . . . undignified.) It will be clearly understood from the Drawings and the following portions of the Specification, that our fractionary remainder bits $r_2r_1r_0$ may be either of the truly intermediate type, as issued from partial quotient tables 3,4,5 and 6, or of the final type, as issued from 5th partial quotient table 7 (all with reference to FIG. 1).

The various partial quotient tables 3–7 are all identical, and their input/output function for division by five is shown in tabular form in FIG. 2. The partial quotient tables 3–7 may be implemented as small ROM's or simply as collections of discrete gating. The latter is preferred where the circuit of block diagram 1 is to be included as part of an integrated circuit.

Refer now to FIG. 2 as we briefly describe the operation of the circuit in the block diagram 1 that is FIG. 1. In short, its operation is very similar to manual long division. The divisor is, of course, assumed, and need not be expressly supplied. The reason that an MSB of 0 is applied to $d_3$ of the $1_{st}$ partial quotient table 3 is to prevent the need for two bits of partial quotient. Five may or may not divide $0x_6x_5x_4$, but at least it will only do so zero or one times, which is all that a single bit (q) can represent. The leading MSB of 0 also allows all of the partial quotient tables be identical. The table 10 in FIG. 2 provides the appropriate combination of partial quotient and fractionary remainder for each division by five of the possible partial dividends that can be applied as inputs to $d_3d_2d_1d_0$. Note the reason why the partial dividends can go as high as nine (1001). The highest remainder is four (100), to which might there might be attached an incoming LSB of 1, making 1001 (nine). It is clear that the fractionary remainders combined with the fractionary dividends produce new partial remainders that each combine with another partial dividend, and so on, to ripple through the circuit until the final quotient 8 and final remainder 9 are produced.

We may make a number of useful observations about circuits having the structure of the block diagram 1 of FIG. 1. First, if the number of bits in the dividend is to increase by some number, say, n, then n-many more stages of partial quotient tables are required, if the complete quotient and remainder are desired. It is conceivable that only an approximation of the final quotient is needed, in which case not all those stages would be required; no final remainder would be available, however.

One would not use this type of circuit to divide a binary number by a power of two. That is much more readily simply by shifting. The particular arrangement shown in FIG. 1 lends itself to division by five, six or seven. There is a desired relationship between the number of input bits $d_3d_2d_1d_0$ for the partial dividend and for the assumed divisor: the partial dividend should have one more bit than the divisor has. So, for example, if it were desired to divide by nine (which uses four bits), then there would be five inputs of $d_4d_3d_2d_1d_0$. In addition, the number of fractionary remainder bits would increase by one to $r_3r_2r_1r_0$, as well. In general, the number of fractionary remainder bits is one less than the number of partial dividend bits. That is a long way of saying that maximum the number of bits for the assumed divisor should be the same as that for the fractionary remainders.

Another way to appreciate the relationship between the number of bits in the dividend and the allowable size range of the divisor is to note the number of final quotient bits available. In FIG. 1 it is one per stage of partial quotient table, which for that example is five. That means that the divisor must be large enough to produce a final quotient small enough to fit in five bits ($0-31_{10}$).

It will no doubt be readily appreciated that numbers expressed in binary, octal and hexadecimal all have the same binary representation. The circuit shown will, with suitable modification for the particulars of the divisor and number of bits in the dividend, work as described for numbers in any of those formats.

The dividend can be a two's complement number, and the proper quotient will be produced, provided the divisor is construed as positive.

One can even appreciate that the general structure in FIG. 1 could be adapted for numbers expressed as BCD digits. It would not be "compact" in terms of the logic, since BCD uses too many bits for the number of symbols it represents, but it would work, nonetheless. When considering this possibility, it should be understood that where individual binary digits (bits) are used in a binary setting, such as we have shown, there will instead be individual BCD digits, which are of course, collections of four bits each. With that in mind, all of the relationships that were mentioned above concerning numbers of bits for divisor, dividend, quotient and remainder, now become numbers of BCD digits, each represented by its four bits.

We have assumed the numbers involved are all integers. That is not necessary, as the location of a radix point can be arbitrarily fixed, independently of the digits of the answer.

Finally, within certain limits one can provide partial quotient tables that operate for selectable divisors. This involves the relatively simple task of combining in one partial quotient table two or more tables as one larger unit whose outputs are just the selected one of the constituent tables, according to value of a "divisor select" input. That amounts to simple addressing in a ROM based implementation, or additional gating in a do-it-yourself circuit. The more important constraint involves the aforementioned relationship between the number of bits in the partial dividends and in the fractionary remainders. This suggests greater feasibility for certain clusters of divisors, such as: three; five, six and seven; and, nine through fifteen. Thus, dividing by three or by fifteen in the same circuit might not be readily feasible. However, one could consider factoring the divisor and cascading divisions by combinations of the factors, according to the combination needed.

Figure 4A:
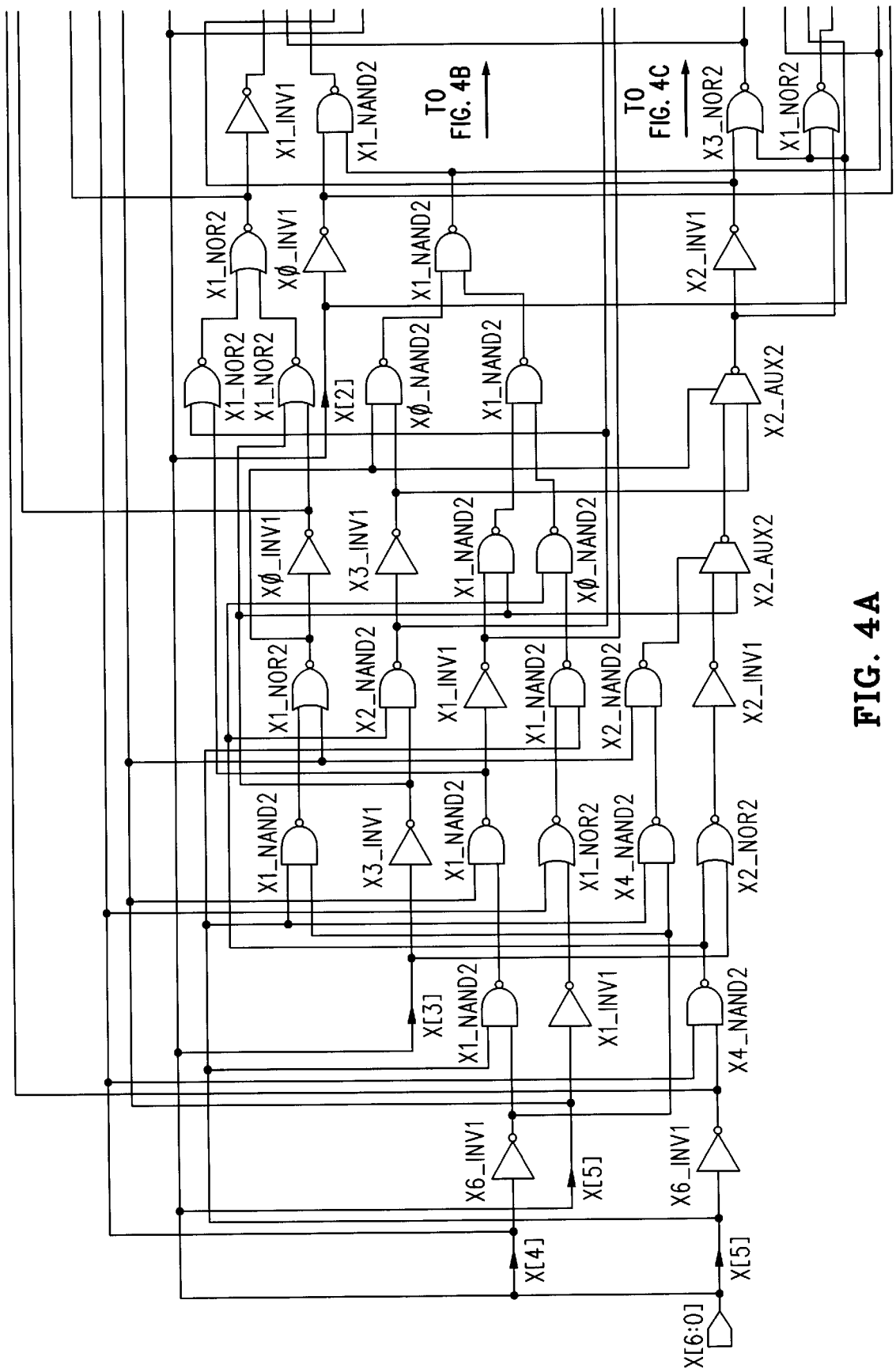
FIGS. 4A–C are a schematic produced by the input specification of FIG. 3.
Figure 4B:
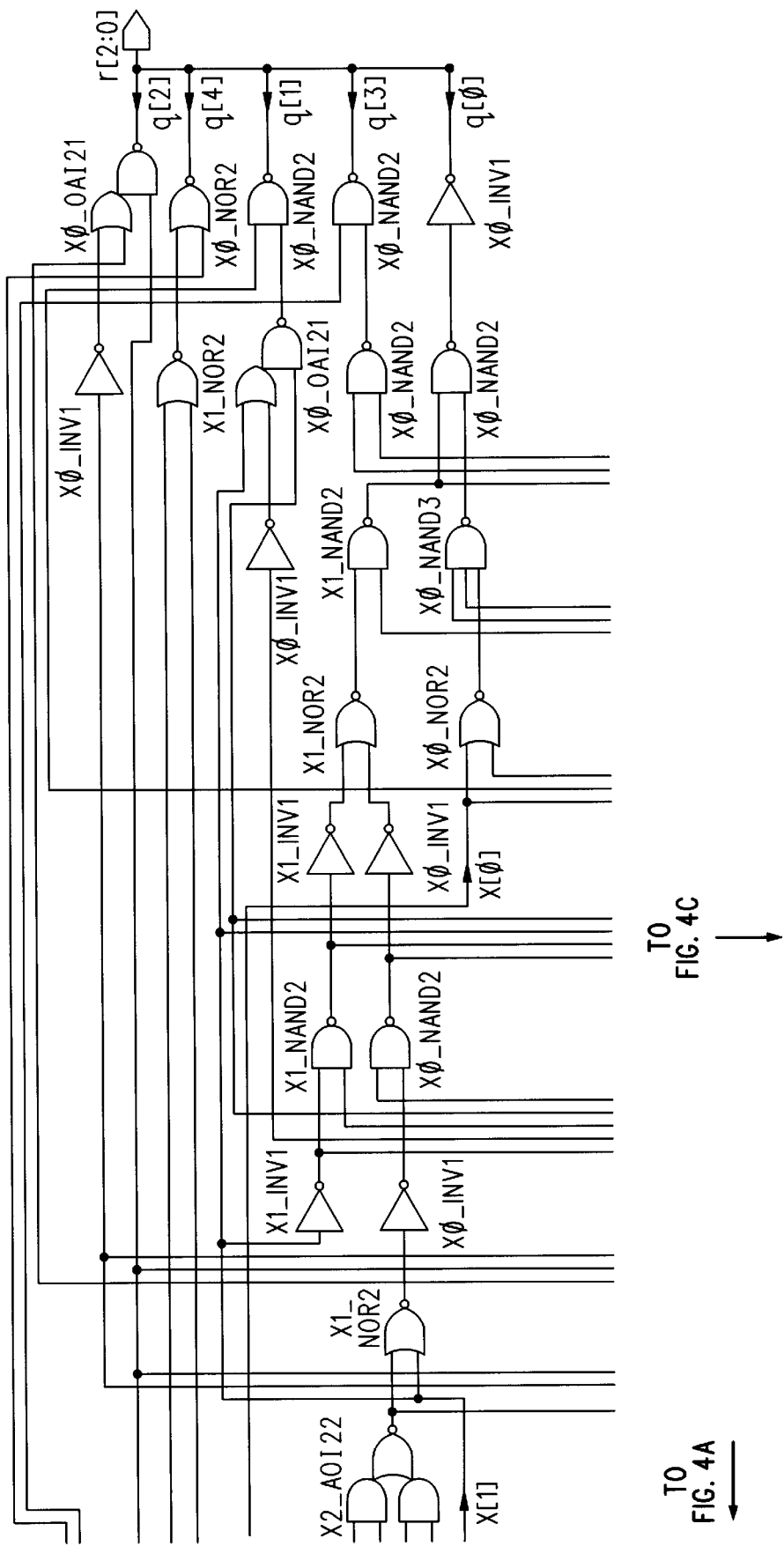
Figure 4C:
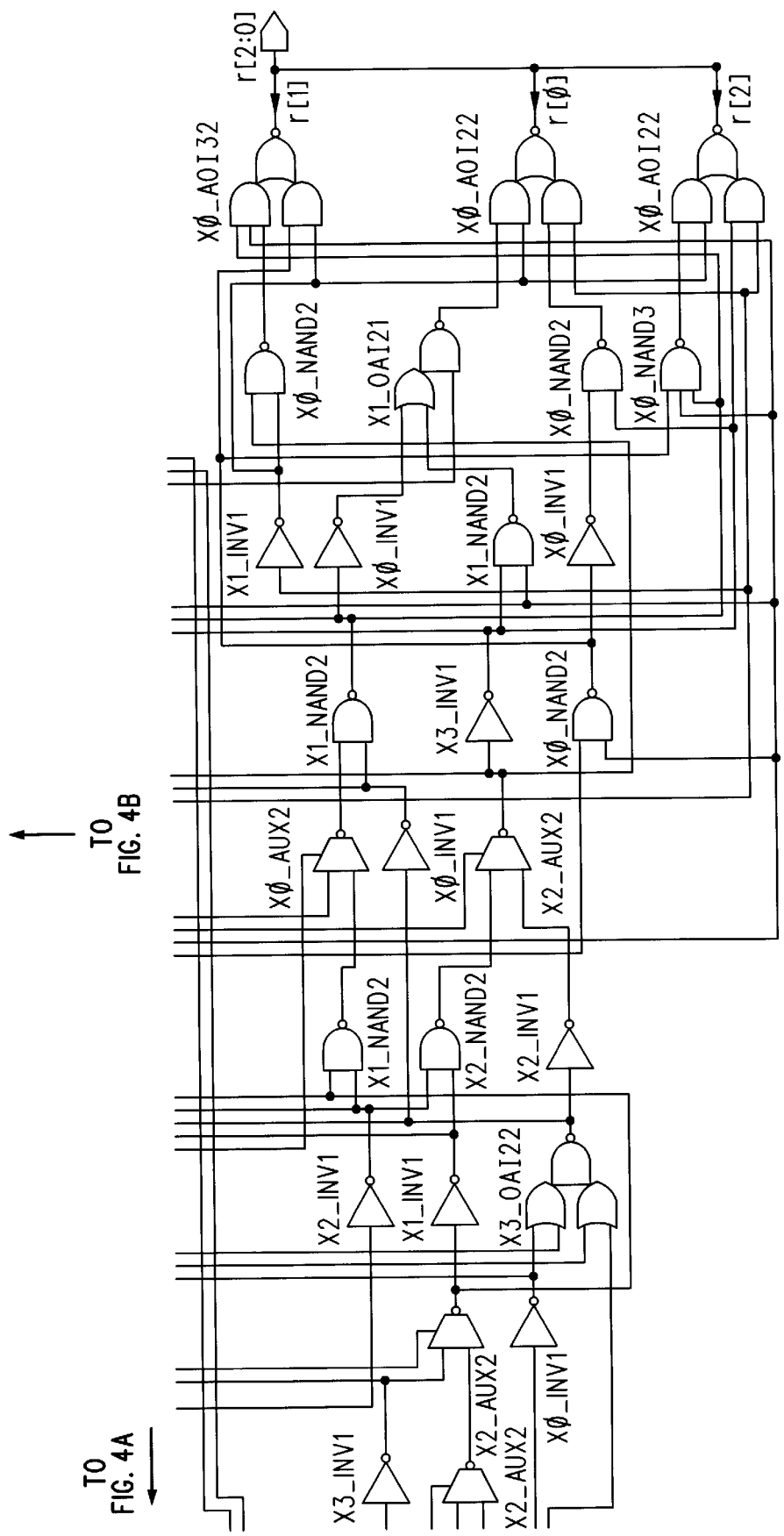

As mentioned above, the preferred manner of implementing the partial quotient tables in an integrated circuit application (such as a multiple channel hardware graphics accelerator for a computer graphics system in a high-end workstation) is to simply lay out the gates on the IC. The way this is done these days is with a logic synthesis language (or other tool), such as Verilog. Suppose that indeed it were desired to divide by five a seven bit dividend expressed as the eight bits $0x_6x_5x_4x_3x_2x_1x_0$. FIG. 3 is exactly such an actual input specification to Verilog. FIGS. 4A–B are the resulting gating circuit. This method has the additional advantage of allowing the synthesis tool perform minimization on the logic to remove redundant terms before creating the required gates. Thus, depending upon how it all works out, there may or may not be an easy-to-see resemblance between the gates in a circuit like that of FIGS. 4A–B and the block diagram of FIG. 1.

Figure 5:
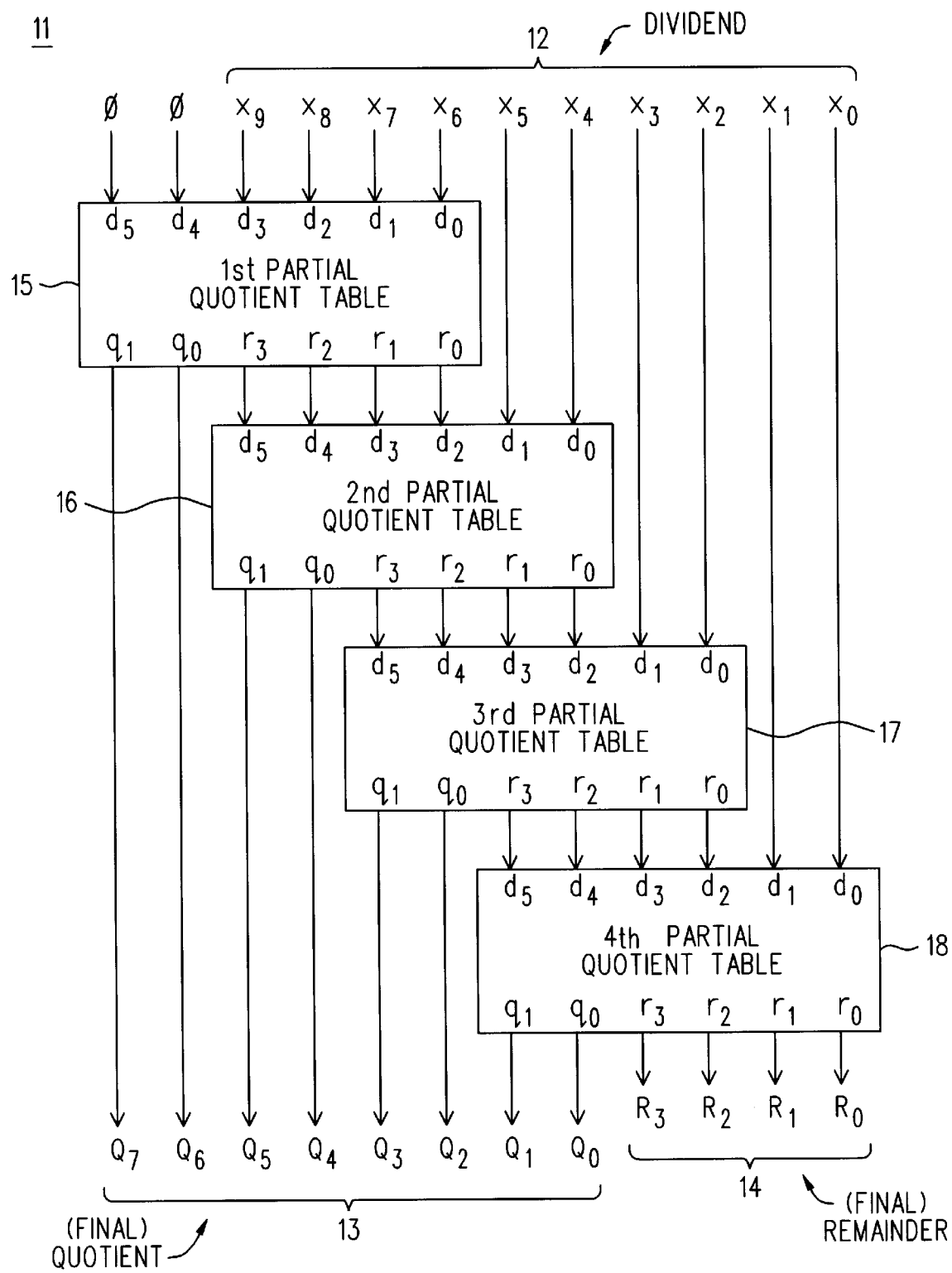
FIG. 5 is a block diagram of a circuit similar to that of FIG. 1, but that produces two bits of quotient per stage.

Refer now to FIG. 5, wherein is shown a block diagram 11 for an alternate embodiment that, while generally similar to that of FIG. 1, produces two quotient bits per stage of partial quotient table. In the block diagram 11 of FIG. 5 a ten-bit dividend 12 expressed in twelve bits with two leading zeros has its six most significant bits $00x_9x_8x_7x_6$ respectively coupled to $d_5d_4d_3d_2d_1d_0$ of the $1_{st}$ partial quotient table 15. The $1_{st}$ partial quotient table 15 produces two partial quotient bits: $q_1$ and $q_0$. These become bits $Q_7$ and $Q_6$, respectively, of the final quotient 13. Also produced by the $1_{st}$ partial quotient table 15 are the fractionary remainder bits $r_3$, $r_2$, $r_1$ and $r_0$. These are coupled to $d_5$, $d_4$, $d_3$ and $d_2$ of the $2_{nd}$ partial quotient table 16, whose $d_1$ and $d_0$ receive $x_4$ and $x_5$, respectively.

We need not dwell further on the interconnections of the cascaded circuit arrangement 11 shown in FIG. 5; the figure speaks for itself. However, there are some things worth pointing out about how it works, especially since there is some contrast with the arrangement of FIG. 1.

First, note that there are eight bits of final quotient. That allows a quotient in the range of $0-255_{10}$. This puts a lower limit on how small the divisor can be. The dividend can be as large as $1023_{10}$, which allows the divisor to be as small as four (four works: 1023/4=255.75; three does not work: 1023/3=341). So, the divisor must be at least three bits, which as a practical matter probably means starting at five (101). This also explains the leading 00 applied to $d_5d_4$ of the $1_{st}$ partial quotient table 15. Now consider how many times a three bit divisor might divide a four bit trial dividend. That is perhaps $7_{10}$ dividing $15_{10}$, or as many as two times. Of course, with two bits of partial quotient we can also represent as few as one or zero times, which is up to four bits of divisor. So, once again we reach the conclusion that assumed divisor can have as many bits as bits in the fractionary remainder. The lower limit for the divisor (i.e., the constant) remains set in accordance with the number of final quotient bits.

We have not included a table that corresponds to FIG. 5 like the table 10 in FIG. 2 corresponds to FIG. 1. Given the present disclosure, however, it is fairly easy to determine the content of such a table. Pick the constant and the number of bits in the fractionary dividend ($d_5$–$d_0$ is six bits). Divide the constant into each of zero through $2^6-1$, and note the fractionary remainders. Because of the size limitation on the constant, there will be at most four cycles of the fractionary remainder needed to go with the four different values that can be represented by the two bits ($q_1$ $q_0$) of fractionary quotient. Thus, the table relates the $2^6$ different dividends to four cycles of fractionary remainders ($0-2^4-1$, or, 0–15), each cycle of which is associated with a different (binary) partial quotient of 0, 1, 2 or 3.

Finally, it should be noted that if all that is desired is the final remainder, then neither of the circuits of FIG. 1 or FIG. 5 needs to produce any partial quotient bits at all; production of the various fractionary remainder bits would be sufficient. This may save some devices in the fabrication of the partial fractionary quotient tables, which might now be more properly termed "fractionary remainder tables".

I claim:

1. A circuit that finds the integer remainder produced when an input number of n bits is divided by a constant, the circuit comprising:

a first circuit having k ordered input bits, k<n and at least the most significant of the k ordered input bits being a forced zero with the remaining ordered input bits coupled to the most significant bits of the input number, the first circuit also having an ordered collection of output bits, being the same in number as the number of ordered input bits coupled to the input number;

a second circuit identical to the first circuit, the ordered input bits of the second circuit being respectively coupled, in order of significance, to the concatenation formed of a most significant portion that is the ordered output bits of the first circuit portion with a least significant portion that is a number q of the most significant unused bits of the input number, q being the number of forced zeros applied to the ordered input bits of the first circuit; and wherein the first and second circuits produce at their respective ordered outputs the binary encodings of the fractionary remainders associated with dividing the binary numbers represented by their respective ordered input bits by the constant.

2. A circuit as in claim 1 that additionally finds a quotient and wherein each of the first and second circuits further comprises a partial quotient output of at least one bit and further wherein respective binary encodings appear at each such partial quotient output and represent the respective integers obtained when the constant divides the binary numbers represented by the respective ordered input bits for each of the first and second circuits.

3. A circuit as in claim 1 wherein the first and second circuits are ROM's.

4. A circuit as in claim 1 wherein the first and second circuits are formed of gating circuits representing combinatorial logic.

5. A circuit as in claim 4 wherein the first and second circuits have been combined into a single circuit whose combinatorial logic has been subjected to logic minimization prior to the formation of the gating circuits.

* * * * *

UNITED STATES PATENT AND TRADEMARK OFFICE
CERTIFICATE OF CORRECTION

PATENT NO. : 5,903,485
DATED : May 11, 1999
INVENTOR(S) : Frank W. Bennett

It is certified that error appears in the above-identified patent and that said Letters Patent is hereby corrected as shown below:

<u>Title page,</u>
Item [57], ABSTRACT,
Line 18, delete "partial" and insert therefor -- fractionary --

<u>Column 3,</u>
Line 66, delete "fractionary" and insert therefor -- partial --
Line 67, delete "partial" and insert therefor -- fractionary --

Signed and Sealed this

Tenth Day of September, 2002

*Attest:*

*Attesting Officer*

JAMES E. ROGAN
*Director of the United States Patent and Trademark Office*